(12) United States Patent
Hong (10) Patent No.: US 11,188,989 B2
(45) Date of Patent: Nov. 30, 2021

(54) METHOD FOR PROVIDING SOCIAL NETWORK SERVICE

(71) Applicant: Sung Kwan Hong, Seoul (KR)

(72) Inventor: Sung Kwan Hong, Seoul (KR)

( * ) Notice: Subject to any disclaimer, the term of this patent is extended or adjusted under 35 U.S.C. 154(b) by 0 days.

(21) Appl. No.: 15/002,594

(22) Filed: Jan. 21, 2016

(65) Prior Publication Data
US 2016/0142494 A1 May 19, 2016

Related U.S. Application Data

(62) Division of application No. 13/880,993, filed on Apr. 23, 2013, now abandoned.

(51) Int. Cl.
*G06Q 50/00* (2012.01)
*H04L 29/08* (2006.01)

(52) U.S. Cl.
CPC ........... *G06Q 50/01* (2013.01); *H04L 67/125* (2013.01)

(58) Field of Classification Search
CPC .............................. G06Q 50/01; H04L 67/125
USPC .................. 709/201–204, 217, 232
See application file for complete search history.

(56) References Cited

U.S. PATENT DOCUMENTS

| | | | | |
|---|---|---|---|---|
| 8,615,434 B2* | 12/2013 | Benyamin | ........... | G06Q 30/0269 705/14.49 |
| 8,694,593 B1* | 4/2014 | Wren | ...... | H04L 51/32 709/206 |
| 8,843,481 B1* | 9/2014 | Xu | .................. | G06F 17/30867 707/732 |
| 2002/0032735 A1* | 3/2002 | Burnstein | .......... | G06F 16/9535 709/204 |
| 2003/0158855 A1* | 8/2003 | Farnham | ............... | G06F 3/0481 |
| 2008/0288439 A1* | 11/2008 | Chandley | .......... | G06F 17/30053 |
| 2009/0193024 A1* | 7/2009 | Dhananjaya | .......... | G06Q 10/10 |
| 2010/0162412 A1* | 6/2010 | Muraki | .................. | G06Q 10/10 726/28 |
| 2010/0174747 A1* | 7/2010 | Farrell | .................. | G06Q 30/02 707/776 |
| 2011/0010355 A1* | 1/2011 | Warren | .................. | G06Q 10/10 707/706 |
| 2011/0022621 A1* | 1/2011 | Luo | ........................ | G06Q 30/02 707/769 |

(Continued)

FOREIGN PATENT DOCUMENTS

WO WO-2009023983 A1 * 2/2009 ............. G06Q 30/02

OTHER PUBLICATIONS

Pouwelse, Johan A., Pawel Garbacki, Jun Wang, Arno Bakker, Jie Yang, Alexandru Iosup, Dick HJ Epema, Marcel Reinders, Maarten R. Van Steen, and Henk J. Sips. "Tribler: A social-based peer-to-peer system." Concurrency and computation: Practice and experience 20, No. 2 (2008): 127.*

*Primary Examiner* — Suraj M Joshi
(74) *Attorney, Agent, or Firm* — LRK Patent Law Firm (57) ABSTRACT

A method for providing a social network service in a service server, which includes: receiving a first keyword from a first terminal of a first member of members of the service server; generating a network related to the first keyword, wherein the network includes an online community; and transmitting a first message inviting to join the network to at least a second member of the members of the service server when a second keyword that is identical or analogous to the first keyword is received from a second terminal of the second member.

6 Claims, 8 Drawing Sheets

(56) References Cited

U.S. PATENT DOCUMENTS

| | | | | |
|---|---|---|---|---|
| 2011/0153759 A1* | 6/2011 | Rathod | ............... | G06Q 10/00 709/206 |
| 2012/0136900 A1* | 5/2012 | Lee | ............... | G06Q 50/01 707/784 |
| 2012/0284063 A1* | 11/2012 | Almonte | ............... | G06Q 50/14 705/5 |

\* cited by examiner

METHOD FOR PROVIDING SOCIAL NETWORK SERVICE

CROSS REFERENCE TO RELATED APPLICATIONS

This application is a division of U.S. patent application Ser. No. 13/880,993, filed Apr. 23, 2013, which was the National Stage of International Application No PCT/KR2011/006431, filed Aug. 31, 2011, which claimed priority to Korean Patent Application No 10-2010-0104014, filed Oct. 25, 2010, the disclosures of which are hereby incorporated by reference in their entireties for all purposes.

BACKGROUND OF THE INVENTION

1. Field of the Invention

The present invention relates to a method for providing a social network service.

2. Description of Related Art

Currently, with the development of computer and Internet-related technologies, a cyber realm on Internet such as a website, a cafe, a community, a bulletin board are created and a social network service (SNS) are provided in variety of ways to enable a plurality of members in such a space to exchange information with one another and facilitate information exchange between related members.

According to the conventional social network service, a network can only be generated by a network administrator or mutual awareness between potential subscribers. For example, according to the prior art, the social network service supports formation of the network by tracking and analyzing electronic information such as an email and providing related user information.

However, in this case, there is a problem in that management and menu configuration is inconvenient with respect to network advertisement, attracting new members for subscription, membership admission, and membership cancellation. In addition, an unfair relationship is created between a network administrator and a general members and information asymmetry exists because mutual awareness is pre-required between users who have intent to participate, which causes a limitation to a network size and increased time required for network expansion.

The above mentioned background arts have been possessed or acquired in the course of eliciting the invention by the inventor, and therefore, it is not conclusive that they are prior arts disclosed to the public.

BRIEF SUMMARY OF THE INVENTION

The present invention is directed to provide a social network service providing apparatus in which users may expand human relationships online by various methods such that, for example, when a user is newly subscribed, network subscription is recommended to the user or a suggestion to form a new network is requested based on the keyword, and when an existing user changes a keyword, a network corresponding to the changed keyword is recommended or requested to be generated, and when a third user generates a network, a user corresponding to a corresponding network is recommended to subscribe thereto.

Also, the present invention is directed to provide a social network service providing apparatus in which an effect to expand a scale of a network to be generated to a maximum extent in real time by implementing a network of a complete equality type in which positions of members subscribed to the network are equal to one another and information asymmetry between the members does not exit and, even if the information asymmetry exists, recognition between users may be automatically performed by a system.

According to an aspect of the present invention, provided is an apparatus for providing a social network service, including: a subscription processing unit which registers an identifier and a keyword of a user by using the identifier of the user; a network search unit which searches for a network having identification information identical to a keyword registered in the storage unit; a network recommendation unit which transmits, to a terminal of the user, a signal requesting subscription to a network corresponding to the keyword; and a network subscription unit which receives a subscription response signal corresponding to the signal requesting subscription to the network from the terminal of the user and subscribes the user to the network.

Here, the keyword may be a character or a symbol designated in correspondence with an interest of the user.

Also, the network search unit may include a keyword extraction unit which extracts the stored keyword according to an identifier of the user and a keyword comparison unit which compares the extracted keyword with identification information of the network, and the network recommendation unit may include a subscription request signal generation unit which generates a signal requesting subscription to the searched network when there exists a network having the same information as the extracted keyword and a message transmission unit which transmits the subscription request signal to the terminal of the user.

Also, an exemplary embodiment of the present invention may further include a network generation unit which transmits a signal requesting suggestion to generate a network having the keyword as the same identification information when a network having the same identification information as the extracted keyword does not exist.

Here, the network generation unit may include a suggestion request signal generation unit which generates a signal requesting suggestion of a network having the keyword as the identification information; a message transmission unit which transmits the suggestion request signal to the terminal of the user as a message; and a network configuration unit which generates a network having the keyword as the identification information by receiving a suggestion response signal corresponding to the suggestion request signal from the terminal of the user.

Also, an exemplary embodiment of the present invention may further include a changed information extraction unit which extracts changed keyword information when the user changes the keyword registered in the storage unit, and the network search unit searches the network using the changed keyword.

Also, an exemplary embodiment of the present invention may further include a generated network correspondence unit which transmits a signal requesting subscription to a generated network to a user having the same keyword as identification information of the generated network when a third user generates a network.

Here, the generated network correspondence unit may include a network generation identification unit which checks whether the network is newly generated; a keyword comparison unit which extracts an identifier of the user having the same keyword as the identification information of the generated network based on comparison with the identification information of the generated network when it is determined by the network generation identification unit that the network is newly generated; and a message transmission unit which transmits, to a terminal of the extracted user, the signal requesting subscription to the generated network as a message.

Also, an exemplary embodiment of the present invention may further include a hub coupling unit which counts a number of subscribed network of each user and designates a user of which number of subscribed network is greater than a reference number of subscribed network as a hub user.

Here, the hub coupling unit may include a subscriber identification unit which counts the number of subscribed network of each user; a hub extraction unit which designates the user of which number of subscribed network is greater than the reference number of subscribed network as a hub user; and a message transmission unit which transmits, to a terminal of the user designated as the hub user, a signal requesting suggestion of a network as a message.

Also, an exemplary embodiment of the present invention may further include a keyword copying unit which copies a keyword of a first user to be added to a keyword of a second user who is not the first user.

Also, the present invention is directed to provide a social network service providing method in which an effect to expand a scale of a network to be generated to a maximum extent in real time by implementing a network of a complete equality type in which positions of members subscribed to the network are equal to one another and information asymmetry between the members does not exit and, even if the information asymmetry exists, recognition between users may be automatically performed by a system.

According to an aspect of the present invention, provided is a method for providing a social network service in a service server, the method including: receiving a first keyword from a first terminal of a first member of members of the service server; generating a network related to the first keyword, wherein the network includes an online community; and transmitting a first message inviting to join the network to at least a second member of the members of the service server when a second keyword that is identical or analogous to the first keyword is received from a second terminal of the second member.

The method may include: receiving a first keyword from a first terminal of a first member of members of the service server; generating a network related to the first keyword, wherein the network includes an online community; and transmitting a first message inviting to join the network to at least a second member of the members of the service server when a second keyword that is identical or analogous to the first keyword is received from a second terminal of the second member.

The method may further include: receiving a third keyword from a third terminal of a third member of the members of the service server; determining whether the third keyword is identical or analogous to the first keyword; and transmitting a second message inviting to join the network related to the first keyword to the third terminal when the third keyword is identical or analogous to the first keyword.

Each of the first, second and third keywords may include a character or a symbol.

Members of the network may share their interest associated with the first keyword on the network related to the first keyword.

The method may further include: receiving a request for changing the third keyword to a fourth keyword from the third terminal; determining whether the fourth keyword is identical or analogous to another keyword; and transmitting a third message inviting to join a network related to the other keyword to the third terminal when the fourth keyword is identical or analogous to the other keyword.

According to another aspect of the present invention, provided is a method for providing a social network service in a service server, the method including: determining a number of networks that each of members of the service server has; determining first members of the members of the service server as hub users when a number of networks that each of the first members has is greater than a predetermined number; and transmitting a message inviting to join a hub network to each terminal of the hub users, wherein each of the networks of the hub users corresponds to a keyword.

The hub network may include a network to which the networks of the hub users expand.

Keywords of the hub users corresponding to the networks may be available to the members of the service server.

The method may further include receiving at least one keyword from a terminal of a user in the members of the service server, the at least one keyword being selected from the keywords of the hub users.

According to a further aspect of the present invention, provided is a method for providing a social online network service in a service server, the method including: receiving a first keyword from a first terminal of a first member of members of the service server; generating a network related to the first keyword, and transmitting a first message inviting to join the network to at least a second member of the members of the service server when a second keyword that is identical or analogous to the first keyword is received from a second terminal of the second member, wherein the transmitting the first message to at least the second member is configured to be determined only by the service server.

Other aspects, features, and advantages of the present invention will become apparent from the following drawings, claims and detailed description of the invention.

DETAILED DESCRIPTION OF THE INVENTION

While various modifications and example embodiments can be made, only particular example embodiments will be described more fully herein with reference to the accompanying drawings. However, the present invention should not be construed as limited to only the example embodiments set forth herein but rather should be understood to cover all modifications, equivalents or alternatives falling within the scope and technical terms of the invention.

It will be understood that, although the terms first, second, etc. may be used herein to describe various elements, these elements should not be limited by these terms. These terms are only used to distinguish one element from another. It will be understood that, when a feature or element is referred to as being "connected" or "coupled" to another feature or element, it can be directly connected or coupled to the other element or intervening elements may be present.

The terminology used herein is for the purpose of describing particular embodiments only and is not intended to be limiting of example embodiments of the invention. It will be understood that the terms "comprises," or "includes," when used herein, specify the presence of stated features, integers, steps, operations, elements, components or any combinations thereof, but do not preclude the presence or addition of one or more other features, integers, steps, operations, elements, components, or any combinations thereof.

Also, the same reference numbers are used throughout the drawings to refer to the same parts regardless of drawing numbers and a repetitive explanation will be omitted. Detailed descriptions of well-known functions and structures incorporated herein may be omitted to avoid obscuring the subject matter of the present invention.

Figure 1:
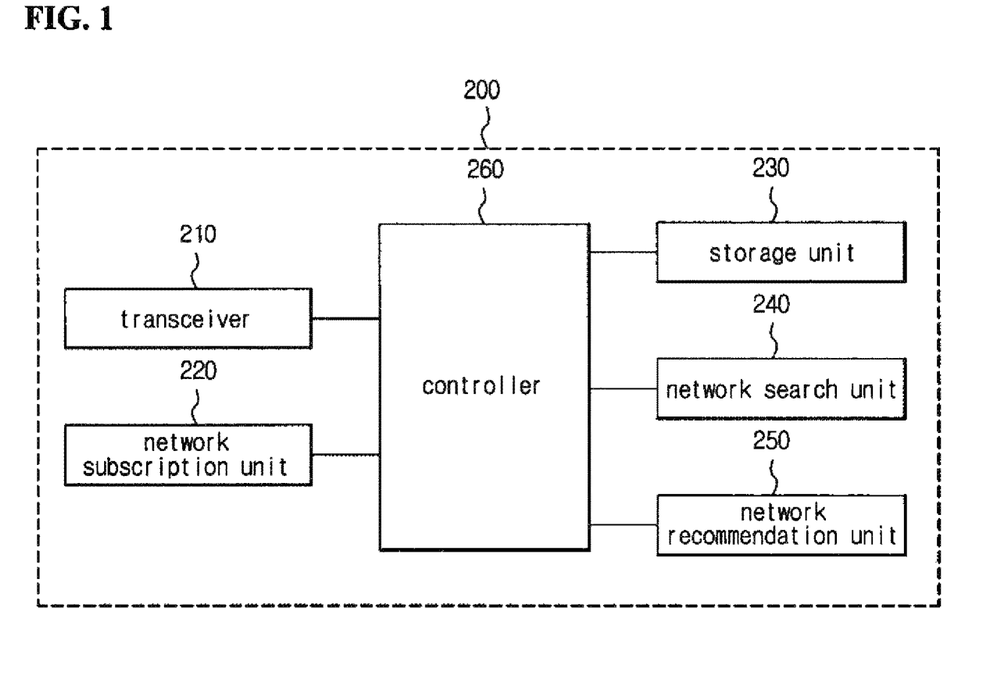
FIG. 1 is a block diagram of a social network service providing apparatus according to a first exemplary embodiment of the present invention.

FIG. 1 is a block diagram of a social network service providing apparatus according to a first exemplary embodiment of the present invention. Referring to FIG. 1, a social network service apparatus 200, a transceiver 210, a network subscription unit 220, a storage unit 230, a network search unit 240, a network recommendation unit 250, and a controller 260 are shown.

The present invention is characterized in that a keyword which reflects a user's interest is used in order to form a network easily and quickly among a plurality of users at a time of providing a social network service (SNS). In other words, the present invention is characterized in that a plurality of users is connected to form a network based on a keyword registered at a time of subscribing for membership or changing user information.

In the present invention, a network is a means for a plurality of users to identify each other's subscription on internet and/or exchange their information with one another through posting information on a bulletin board, transmitting a message, and internet chatting, and for example, the network may be referred to as various names such as a cafe, a community, a group, a bulletin board, a meeting, a circle, and a club.

The keyword of the present invention may be a character or a symbol designated in correspondence with a user's interest when the user subscribes to membership or changes the user's information. The keyword may be a character or a symbols input directly by the user or may be a pre-specified option that can be selected by the user through a check box, a radio button, etc. The keyword may be various topics reflecting, for example, science, politics, economy, society, culture, current affairs, education, person, sports, religion, and books.

If, the user is interested in an election and enters a name of a specific person of a specific district, a network which has such name as a keyword is created immediately or, when a corresponding network exists already, the network may be recommended. According to such method of the present invention, a network of users who are interested in a corresponding person may be created immediately and an advantage of immediately encouraging user participation is achieved.

Such network crosses beyond temporal and spatial limitations in a real word and can be a means to extend widely a human relationship in a sense that a community where people with same interests may exchange and share their opinions may be formed if the keywords are identical. In other words, the user may have an advantage of forming a wide human relationship by forming a somewhat weak link on the internet compared to a strong link formed in the real world where people are closely linked by facing each other. The weak link may perform a role to widen the human relationship formed by the user compared to the strong link.

The social network service apparatus 200 is an apparatus which is connected to a user terminal online such as wired or wireless internet. The social network service apparatus 200 enables a plurality of users to identify each other by a predetermined identifier. For example, the user subscribes to the social network service apparatus 200 for membership by using the identifier such as ID and/or a password. In this case, when the user subscribes to membership, a membership processing unit (not shown) may perform a necessary procedure such as checking duplication of a user ID and subscribe the user as a member by using the user's identifier.

The social network service apparatus 200 may be a predetermined web server and may perform various functions such as a search function, an advertising function, a network formation, etc. as in a portal site.

The transceiver 210 transmits and receives data between the social network service apparatus 200 and the user terminal and, for example, exchanges data with the user terminal according to a TCP/IP communication system.

The user terminal is a device used by the user and may be a notebook computer, a laptop computer, a PC, a portable terminal etc., and the portable terminal is a small digital device with portability and may include a device that has communication capabilities such as a personal digital cellular (PDC) phone, a personal communication service (PCS)

phone, a personal handyphone system (PHS) phone, CDMA-2000 (1×, 3×) phone, a wideband CDMA (WCDMA) phone, a dual band/dual mode phone, a global standard for mobile (GSM) phone, a mobile broadband system (MBS) phone, a digital multimedia broadcasting (DMB) terminal, a smart phone, an orthogonal frequency division multiplexing (OFDM) terminal, and an orthogonal frequency division multiplexing access (OFDMA) terminal.

The network subscription unit 220 subscribes the user as a network member. In other words, the network subscription unit 220 subscribes the user to the network by receiving a subscription response signal corresponding to a network subscription request signal from the user terminal, which will be described later.

The storage unit 230 stores various data required to operate the present invention. The storage unit 230 may be a database saving for storing data or a means for storing data in a database. For example, the storage unit 230 may store the user's identifier, keyword, subscribed network, configuration information of each network, identification information of each network, etc. The identification information of the network may be a character or a symbol for identifying the network. The identification information of the network may be information of an identical nature to the aforementioned keyword, for example, topics reflecting contents such as science, politics, economy, society, culture, current affairs, education, person, sports, religion, and books. The identification information is a symbol for identifying the network and may be described as various terms such as identification information, identification information of the network or a network keyword hereinafter.

When the identification information of the network is a name of a specific person who runs for an election, in a case where the identification information of the network is identical to the user's keyword based on comparison with the user's subscribed keyword as described above, the present invention may recommend the user to subscribe to a corresponding network.

Here, the identification information of the network may be a plurality of different information. For example, if the identification information of the network is a name of a specific person who runs for an election, the corresponding network may further include a term such as 'election', 'general election', 'vote', as the identification information thereof. In this case, the corresponding network may be recommended to various users by including various identifications information and the user may selectively choose the recommended network according to the user's need.

The network search unit 240 searches a network that has identification information identical to a keyword registered in the storage unit 230. The number of an entire network may be determined including the network created by the user and the pre-created network corresponding to specific topics, for example, science, politics, economy, society, culture, current affairs, education, person, sports, religion, and books in the social network service apparatus 200.

Each network may include its own identification information as described above. In addition, the network search unit 240 may search a network which has similar identification information as well as a network which has identification information identical to the keyword as described above. Here, determining similarity of information may be performed based on a predetermined degree of similarity. For example, when the keyword and the identification information comprise a character and 50% to 60% or greater of characters thereof match to each other, the network search unit 240 may determine the similarity and extract a corresponding network. Hereinafter, a case where the keyword and the identification information are identical is described.

In addition, according to another exemplary embodiment, if the keyword and the identification information belong to an identical upper layer, a related network may be determined as a network corresponding to the keyword. For example, considering a case where a word 'election' is an upper layer, and words such as 'general election', 'election district A', 'election day' belong to a lower layer and are saved in the storage unit 230, if the user's keyword is 'general election' and the identification information of a specific network is 'election day', the 'general election' and 'election day' belong to the same upper layer, and the network search unit 240 judges this as a similar area and allow the user to search and extract a corresponding network of which identification information is 'election day'.

Here, the upper layer and the lower layer may be classified by an administrator of the social network service apparatus 200 to be saved in the storage unit 230 or classified based on a pre-set criterion to be saved in the storage unit 230. For example, the pre-set criterion may be various criteria such as a criterion for classifying a corresponding word as the lower layer when a word identical to a word of the upper layer is partially included and a criterion for classifying according to the user's choice by providing an option of choosing the upper layer of a corresponding keyword when the user registers the keyword.

The network recommendation unit 250 recommends a corresponding network to the user by transmitting, to the user's terminal, a signal requesting subscription to a network corresponding to the user's keywords. The network recommendation unit 250 recommends the user to subscribe to a network which is searched as having the identification information corresponding to the corresponding keyword in the network search unit 240 such that the number of a subscribed member of the network is increased immediately, thereby achieving an effect of exchanging various information among various users.

Here, the network subscription request signal is a signal which has a content of recommending subscribing to a corresponding network and does not have limitation to its formality. For example, the network subscription request signal may be transmitted by various messages such as an email, SMS, LMS, MMS, or a message that contains a content recommending subscription.

The user may transmit a response signal of acceptance or rejection to the social network service apparatus 200 in response to the received network subscription request signal. The social network service apparatus 200 does not perform any separate action if the response signal of rejection is received and causes the network subscription unit 220 to subscribe the user to the network by registering corresponding user information with the recommended network when the response signal of acceptance is received.

The controller 260 controls an overall operation of the aforementioned social network service apparatus 200 and particularly controls each function of the transceiver 210, the network subscription unit 220, the storage unit 230, the network search unit 240, and the network recommendation unit 250 to be performed in association with one another.

Figure 2:
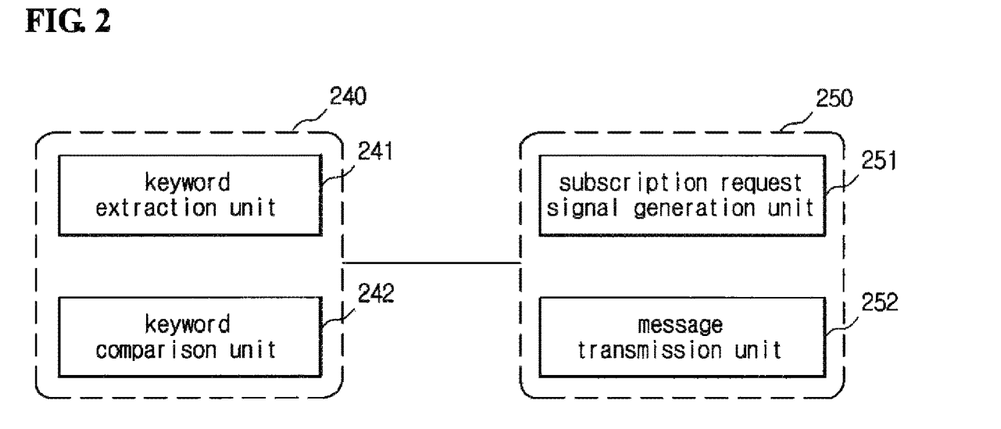
FIG. 2 is a block diagram of a network search and recommendation unit of the social network service providing apparatus according to the first exemplary embodiment of the present invention.

FIG. 2 is a block diagram of a network search and recommendation unit of the social network service providing apparatus according to the first exemplary embodiment of the present invention. Referring to FIG. 2, the network search unit 240 may include a keyword extraction unit 241, a keyword comparison unit 242, and the network recommendation unit 250 may include a subscription request signal generation unit 251 and a message transmission unit 252.

This exemplary embodiment relates to a function of recommending a network to the user after the network search unit 240 and the network recommendation unit 250 search and extract the network. The network search unit 240 may include the keyword extraction unit 241 which extracts a keyword stored according to each user identifier and the keyword comparison unit 242 which compares the extracted keyword with the identification information of the network. In other words, the network search unit 240 extracts a specific keyword of the user among data stored in the storage unit 230, compares the extracted specific keyword with identification information of a network, and extracts a network which has the identical identification information with the keyword.

The network recommendation unit 250 may include the subscription request signal generation unit 251 which generates a signal requesting to subscribe to the searched network when the network has the identical identification information with the extracted keyword exists and the message transmission unit 252 which transmits the subscription request signal to the user's terminal as a transmitting message.

Figure 3:
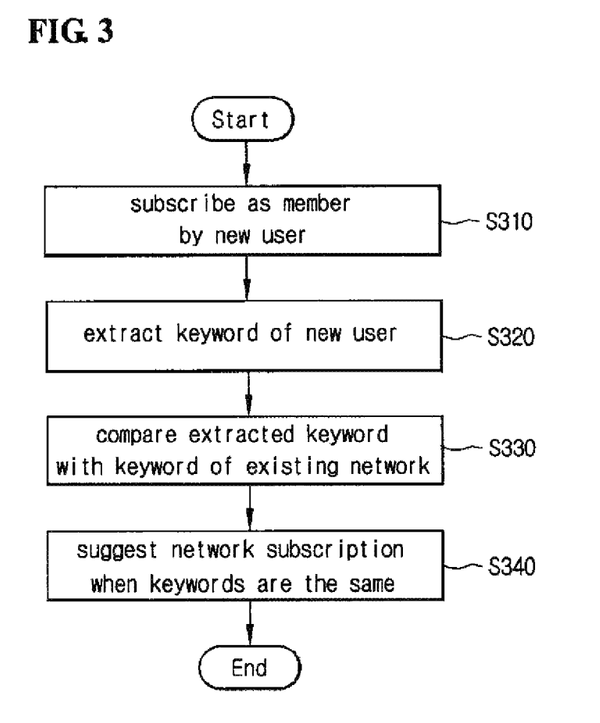
FIG. 3 is a flowchart of a social network service providing method according to the first exemplary embodiment of the present invention.

FIG. 3 is a flowchart of a social network service providing method according to the first exemplary embodiment of the present invention. Hereinafter, each step performed by the social network service apparatus 200 is described.

At step S310, a new user subscribes as a member to the social network service apparatus 200 as described above. The user may be distinguished from other users in the social network service apparatus 200 by obtaining distinction in various methods such as assigning ID and PW or certifying by a certification (public or private).

At step S320, the new user extracts a keyword entered at the time of subscribing as a member. The new user may directly enter or select the keyword which reflects a matter of interest when subscribing as a member, as described above, and this keyword may be registered as a mandatory or an option when subscribing as a member. In order for the user to easily register the keyword, a text box may be provided on a member subscription screen or, a radio button or a check box that can select the keyword may be provided output.

At step S330, the network search unit 240 of the social network service apparatus 200 compares the extracted keyword to the existing identification information of the network which has been formed in advance and judges whether they match each other. At step S340, the network recommendation unit 250 recommends a corresponding network to the user to subscribe thereto in various methods such that the user may recognize if the keyword and the identification information matches each other.

Figure 4:
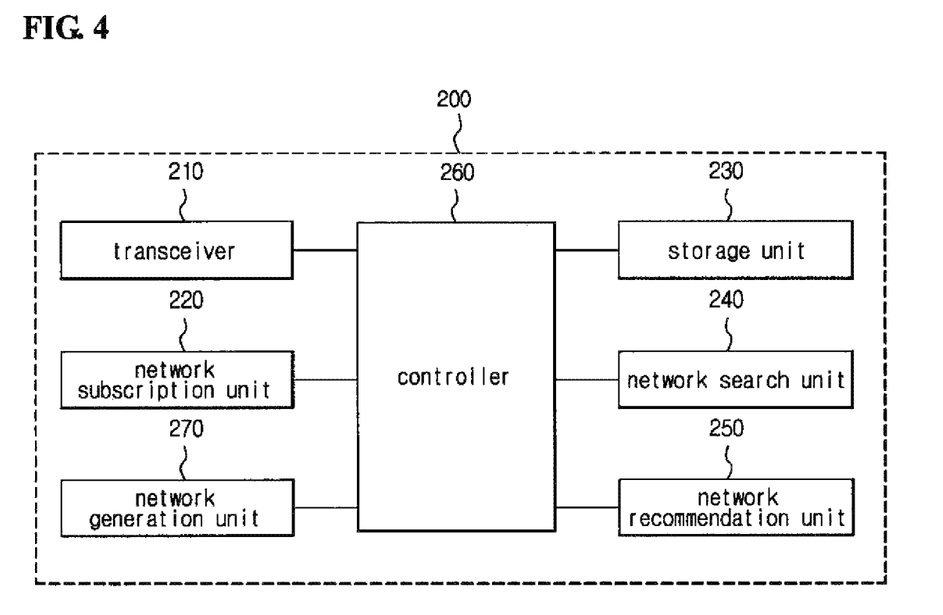
FIG. 4 is a block diagram of a social network service providing apparatus according to a second exemplary embodiment of the present invention.

FIG. 4 is a block diagram of a social network service providing apparatus according to a second exemplary embodiment of the present invention. Referring to FIG. 4, the social network service apparatus 200, the transceiver 210, the network subscription unit 220, the storage unit 230, the network search unit 240, the network recommendation unit 250, the controller 260, and a the network generation unit 270 are shown. A description will be made primarily with respect to a difference from the above described embodiment.

This embodiment is characterized in that an element for allowing the user to suggest generation of a network that has not been generated yet is included. In other words, according to this exemplary embodiment, when the network corresponding to the user's keyword does not exist, it is characterized in that the user is allowed to suggest generating the corresponding network, thereby assisting generating various networks by the user.

If the identification information of the network identical to the keyword extracted from the keyword extraction unit 241 does not exit, the network generation unit 270 transmits a signal requesting suggestion of generating a network which has the same identification information as the keyword to the user's terminal. In other words, when a related network is not searched when searching a network based on the user's keyword, the user is allowed to directly generate a corresponding network.

Here, a network to be created may not be a type of a network managed by the user. In other words, a network of this embodiment may be a type that is managed by a social network service apparatus 200 corresponding to a pre-set management standard method. For example, the social network service apparatus 200 may provide, according to preset standards, a number of bulletins provided in the network to be created, names of bulletins, and contents of disclosed information, and also may preset a member subscription criterion, cancellation criterion, and an operation criterion.

According to this type of a network, members are in a mutually equal status, that is, a completely equal status where an administrator does not exist separately and subscription, management, and cancellation of the membership may be performed corresponding to the pre set criteria.

Therefore, according to this present embodiment, when the user suggests generating the network, in other word, when the user transmits the response signal accepting the signal requesting network generation transmitted by the network generation unit 270, the network can be easily generated because a network based on the user's network may be immediately created, and the user does not need to manage separately, thereby achieving an advantage in that the user may conveniently use the network.

In this case, the user to suggest network generation transmits, to the network generation unit 270, a third user's eligibility to subscribe as the member to the network generated by user, that is, the user's comments proposing which user is wanted to subscribe, together with the response signal, and the network generation unit 270 may save a received content corresponding to the network to be generated. Hereinafter, as described above, when the network recommendation unit 250 recommends the corresponding network to the third user, the user's comments and suggestion may be transmitted along with the subscription request signal to assist the third user to accept subscription.

Figure 5:
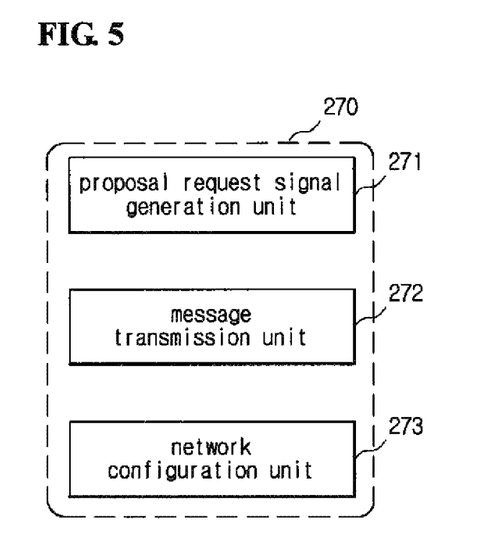
FIG. 5 is a block diagram of a network generation unit of the social network service providing apparatus according to the second exemplary embodiment of the present invention.

FIG. 5 is a block diagram of a network generation unit of the social network service providing apparatus according to the second exemplary embodiment of the present invention. Referring to FIG. 5, the network generation unit 270 may include a suggestion request signal generation unit 271, a message transmission unit 272, and a network configuration unit 273.

The suggestion request signal generation unit 271 may generate a signal requesting network suggestion which has the same identification information as the user's keyword if the network with the same identification information as the keyword extracted from the keyword extraction unit 241 does not exist. The user may generate a corresponding network by transmitting only the response signal proposing only the generation corresponding to a suggestion request signal. In addition, the user may register the identification information and a content of subscription suggestion of the corresponding network in detail by transmitting the suggestion request signal as well as various different identifications information and/or user's comments and suggestion as described above.

The message transmission unit 272 may transmit the suggestion request signal as a message to the user's terminal. The messages can be in various forms, such as an email, an SMS, an LMS, and a note, as described above. The messages may include the suggestion request signal, the user's identification information, and similar identification information.

The network configuration unit 273 may receive a suggestion response signal corresponding to the suggestion request signal from the user's terminal to generate a network having the user's keyword and/or a user's newly designated keyword as the identification information. The network configuration unit 273 may set data related to network screen configuration, membership management, information exchange methods, etc. corresponding to the newly generated network. Here, configuration data of the newly generated network may be saved in the storage unit 230 in a form of a template per each unit. For example, the storage unit 230 may save screen configuration data, configuration data, bulletin related data according to a functionality and a configuration thereof, and the network configuration unit 273 may extract the related data corresponding to a pre-set management standardization method and may configure the network by using the extracted data as described above.

Figure 6:
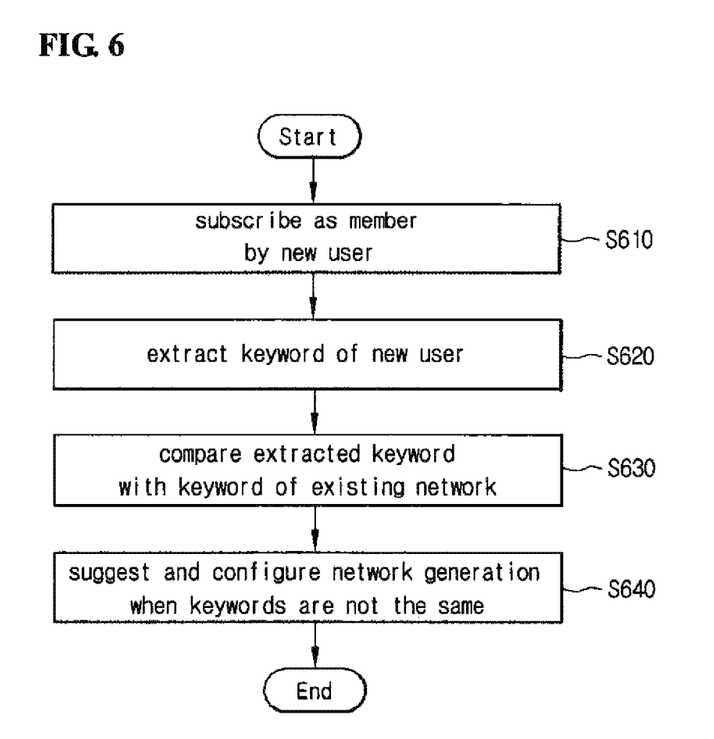
FIG. 6 is a flowchart of a social network service providing method according to the second exemplary embodiment of the present invention.

FIG. 6 is a flowchart of a social network service providing method according to the second exemplary embodiment of the present invention. Hereinafter, each step performed by the social network service apparatus 200 will be primarily described.

At step S610, a new user subscribes to the social network service apparatus 200 as a member by obtaining distinction by different means such as being assigned an ID and a PW or being certified by a certification (public or private) as described above.

At step S620, the new user extracts a keyword that is input or selected at the time of membership subscription. At step S630, the network search unit 240 of the social network service device compares the extracted keyword with the identification information that is formed in advance of the network to judge if they match each other.

At step S640, when the network having the same identification information as the keyword, the network generation unit 270 requests suggestion to the network generation by transmitting a signal requesting suggestion to the network generation to the user, and thereafter, generates the network as described above when the suggestion response signal to the signal requesting suggestion to the network generation from the user's terminal. It should be noted that the generated network may become a search object of the network search unit 240 and may be a recommendation object of the network recommendation unit 250.

In addition, according to another exemplary embodiment, the network generation unit 270 classifies the extracted keyword based on equality, and an identical keyword may be tied to an identical group. The network generation unit 270 transmits a message suggesting network subscription to one or more users having the keyword tied to the identical group and may generate a network having the user's keyword as the identification information as described above when a message accepting subscription is received from at least one user.

Figure 7:
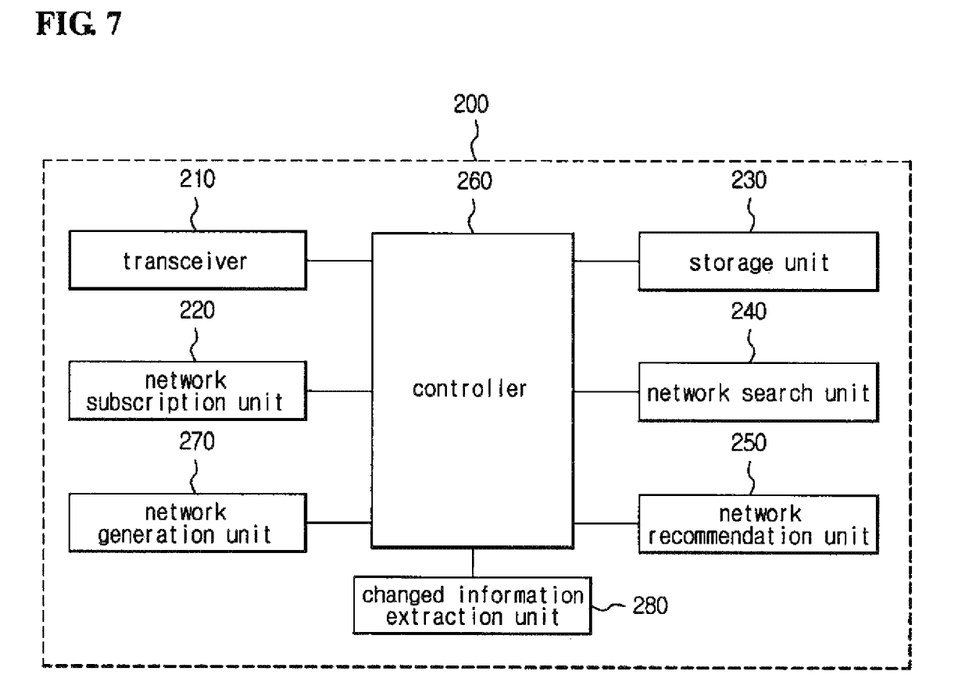
FIG. 7 is a block diagram of a social network service providing apparatus according to a third exemplary embodiment of the present invention.

FIG. 7 is a block diagram of a social network service providing apparatus according to a third exemplary embodiment of the present invention. Referring to FIG. 7, the social network service apparatus 200, the transceiver 210, the network subscription unit 220, the storage unit 230, the network search unit 240, the network recommendation unit 250, the controller 260, the network generation unit 270, and a changed information extraction unit 280 are shown. A description will be made primarily with respect to a difference from the above described embodiment The present embodiment is characterized in that, when the user changes the keyword such as newly registering the user's keyword, revising, or deleting the existing keyword, a network corresponding to the changed keyword is newly recommended or generated.

The changed information extraction unit 280 extracts changed information when the user who already subscribes to the social network service apparatus 200 as the member changes the user's keyword. For example, when a change is applied to a specific table data and the user's keyword is changed in the storage unit 230 by using a storage procedure trigger which performs automatically, the changed information extraction unit 280 compares a keyword prior to change and a keyword after change and, when the two are not the same, causes a related network to be recommended or generated by extracting the changed keyword.

In other words, the network search unit 240 searches the network by using the extracted keyword, and the network recommendation unit 250 recommends the user to subscribe a corresponding network when there is a network having the same identification information as the corresponding keyword, otherwise, the network generation unit 270 requests to the user generating a new network.

Figure 8:
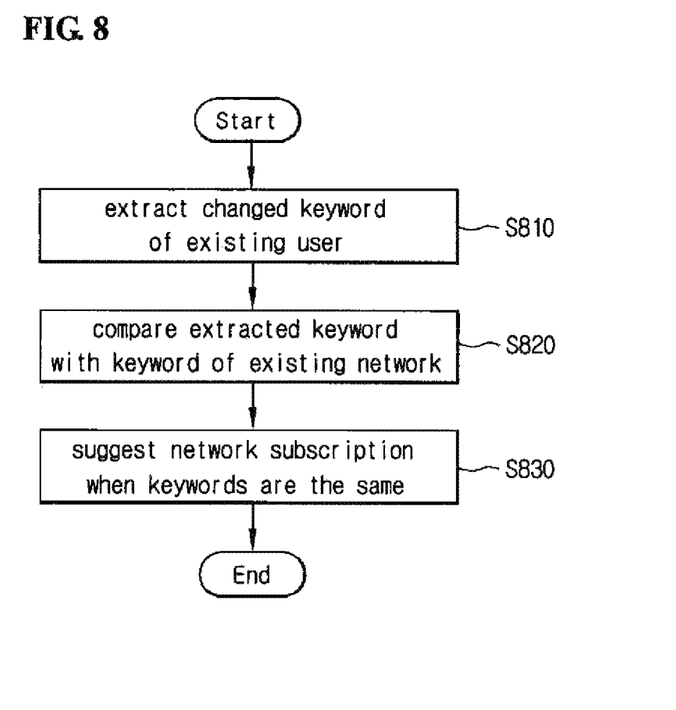
FIG. 8 is a flowchart of a social network service providing apparatus according to a third exemplary embodiment of the present invention.

FIG. 8 is a flowchart of a social network service providing apparatus according to a third exemplary embodiment of the present invention. Each step may be performed by the social network service apparatus 200 and elements thereof.

At step S810, the changed information extraction unit 280 checks if an existing user's keyword has been changed and extracts changed keyword information if the user changes the keyword registered in the storage unit 230.

At step S820, the network search unit 240 searches the network by using the changed keyword. In other words, the network search unit 240 compares the changed keyword extracted by the user's change with the existing identification information of the network. Here, it is described that the changed information extraction unit 280 is a separate and different element from the network search unit 240, however, it should be noted that the changed information extraction unit 280 may be implemented as a portion element of the network search unit 240.

At step S830, if the user's changed keyword and the identification information of the network are identical, the network search unit 240 extracts the corresponding network and the network recommendation unit 250 may recommend the user having the corresponding keyword to subscribe to the extracted network as described above.

Figure 9:
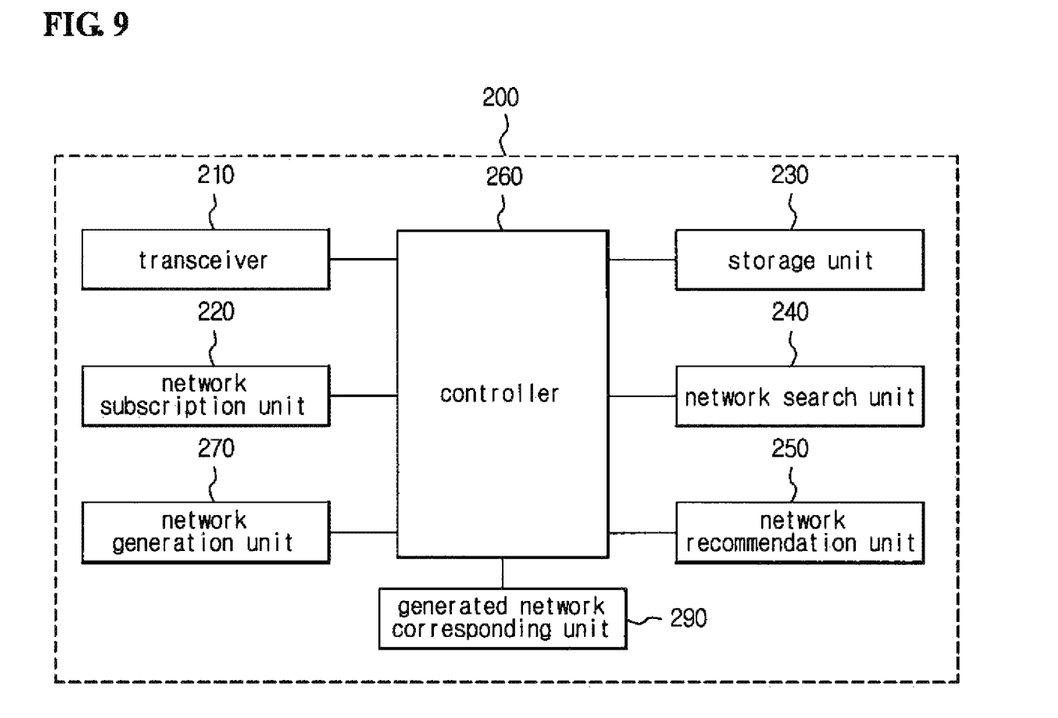
FIG. 9 is a block diagram of a social network service providing method according to a fourth exemplary embodiment of the present invention.

FIG. 9 is a block diagram of a social network service providing method according to a fourth exemplary embodiment of the present invention. Referring to FIG. 9, the social network service apparatus 200, the transceiver 210, the network registration unit 220, the storage unit 230, the network search unit 240, the network recommendation unit 250, the controller 260, the network generation unit 270, and a generated network corresponding unit 290 are shown. A description will be made primarily with respect to a difference from the above described embodiment.

The present embodiment is characterized in that, when the user who subscribes to the social network service apparatus 200 suggests a network to newly generate the network, network generation information is shared such that another user may subscribe to the newly generated network. According to this embodiment, when the network is newly generated, another user is induced to subscribe to the corresponding network, thereby achieving an advantage to enable network expansion easily.

The generated network corresponding unit 290 transmits the signal requesting to subscribe to the generated network to the user who has the keyword identical to the identification information of the generated network when a third user generates the network. In other words, the generated network corresponding unit 290 may check whether the network is generated newly, and when the network is determined as being newly generated, may extract the user's identifier having the same keyword compare to the identification information of the generated network and may transmit the signal requesting to subscribe to the generated network to the corresponding user.

Figure 10:
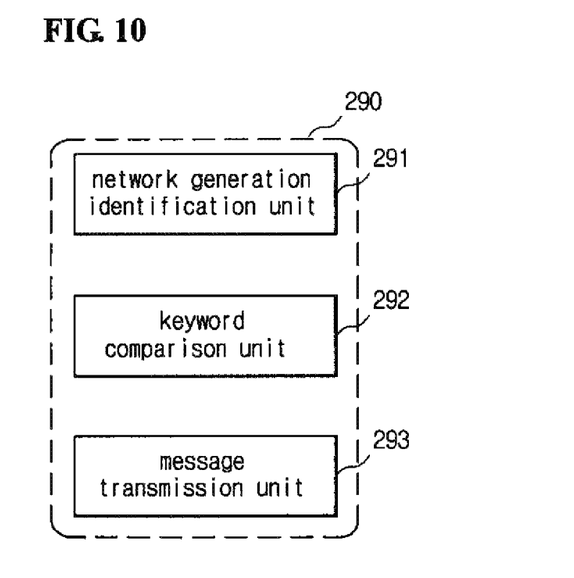
FIG. 10 is a block diagram of a social network correspondence unit of the social network service providing method according to the fourth exemplary embodiment of the present invention.

FIG. 10 is a block diagram of a social network correspondence unit of the social network service providing method according to the fourth exemplary embodiment of the present invention. Referring to FIG. 10, the generated network corresponding unit 290 may include a network generation identification unit 291, a keyword comparison unit 292, and a message transmission unit 293.

The network generation identification unit 291 checks if the network is newly generated. The network may be generated in correspondence with the suggestion response signal transmitted in response to the suggestion requesting signal for network generation of the user or may be generated by network generating tools used directly by the user.

In the latter case, for example, similar to generating a general café in a portal site, the user may generates the network by determining a network name, a screen output configuration, or a number of bulletins, etc. The social network service apparatus 200 may store various network generation data for generating a network in the storage unit 230 and a detailed description thereof will be omitted because a technology related to network generation are well known to a person of ordinary skilled in the art.

When it is determined that the network is newly generated in the network generation identification unit 291, the keyword comparison unit 292 extracts the user's identifier that has the identical keyword based on comparison with the identification information of the generated network.

The message transmission unit 293 transmits a signal requesting to subscribe to the generated network as a message to the user's terminal.

Figure 11:
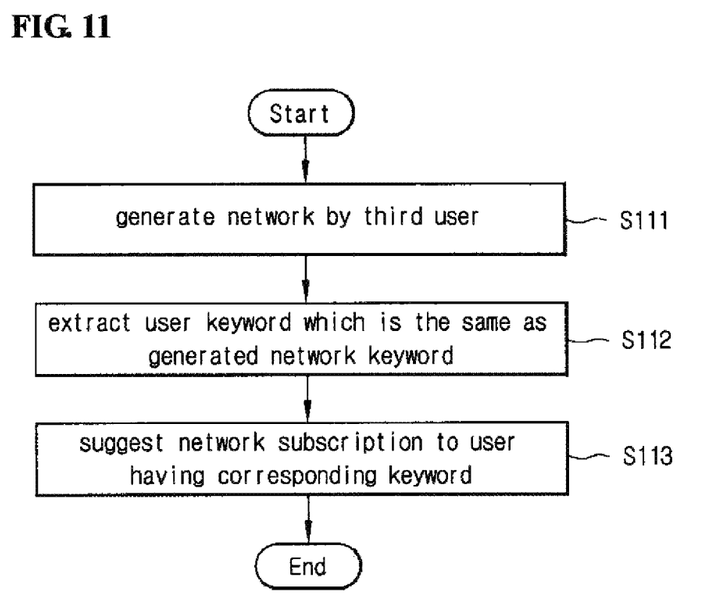
FIG. 11 is a flowchart of a social network service providing apparatus according to the fourth exemplary embodiment of the present invention.

FIG. 11 is a flowchart of a social network service providing apparatus according to the fourth exemplary embodiment of the present invention. Each step may be performed by the social network service apparatus 200 and elements thereof.

At step S111, the user who subscribes to the social network service apparatus 200 generates the network corresponding to a network generating suggestion request signal or directly generates the network using the network generating data saved in the storage unit 230, as described above.

At step S112, the keyword identical to the identification information of the generated network is extracted to extract user information of the corresponding keyword. At step S113, the network subscription requesting signal may be transmitted to the user's terminal in order to propose subscription to the corresponding network to the user who has the keyword identical to the identification information of the generated network.

Here, the third user may match a predetermined message such as 'political view is liberal, age is 00 years old', i.e., a message for recommending subscription at the time of network generation to the generated network. In this case, the social network service apparatus 200 may transmit the above user's message to the user's terminal along with the network subscription request signal.

Therefore, according to exemplary embodiments of the present invention, when the user newly subscribes, a suggestion is requested to recommend the user to subscribe to the network or to form a new network, and when the existing user changes the keyword, recommends the network or requests generation of the network corresponding to the changed keyword, and when the third user generates a network, recommends the user corresponding to the corresponding network to subscribe, thereby achieving an advantage of broadening a human relationship of the user online by expanding a network with various methods.

Figure 12:
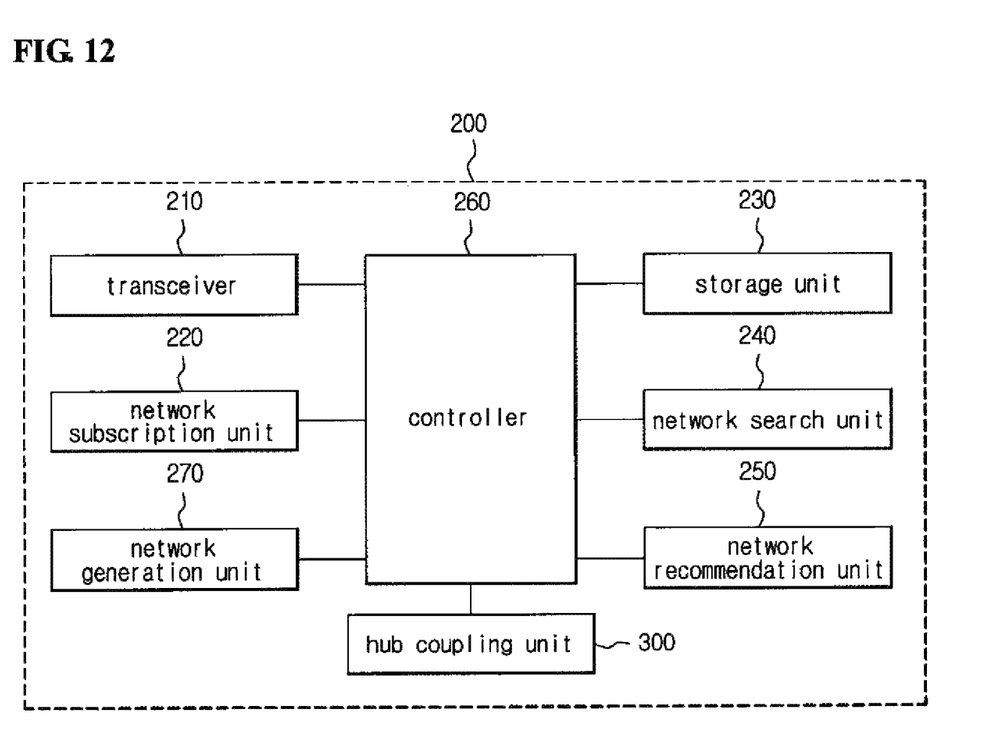
FIG. 12 is a block diagram of a social network service providing apparatus according to a fifth exemplary embodiment of the present invention.

FIG. 12 is a block diagram of a social network service providing apparatus according to a fifth exemplary embodiment of the present invention. Referring to FIG. 12, the social network service apparatus 200, the transceiver 210, the network subscription unit 220, the storage unit 230, the network search unit 240, the network recommendation unit 250, the controller 260, the network generation unit 270, and a hub coupling unit 300 are shown. A description will be made primarily with respect to a difference from the above described embodiment The present embodiment is characterized to form a network consisting of users who have a wide network, thereby further widening the network. Specific users who subscribe to many networks are vigorous on network activities and have a high probability to exchange information with each other such that the network may be further expanded by configuring the network consisting with such users.

The hub coupling unit 300 counts a number of the network subscribed by each user and designates a user of which a number of network subscribed by the user is greater than a reference number of subscribed networks as a hub user. Here, the user designated as the hub user may receive the suggestion request signal for network generation from the network generation unit 270 or generates the network by receiving the network subscription request signal from the network recommendation unit 250 or may subscribe to a network created in advance by another hub user.

Here, the reference number of subscribed networks may be a variable considering a pre-specified constant or an average number of subscribed networks. For example, the reference number of subscribed network may be a constant to be determined 20 to 100 or a number of subscribed networks of top 5% to 10% of a number of subscribed networks of all users.

In addition, according to another exemplary embodiment, the hub user may be recorded in the storage unit as the hub user when designated or when a certain requirement is met. For example, the hub user may be temporarily designated by a system administrator or by a plurality of users. In the latter case, the present embodiment may further include a hub recommendation unit which suggests each user to recommend designation of the hub user. For example, the user transmits a signal recommending a specific user as the hub user to the social network service apparatus 200 by using the hub recommendation unit, and the social network service apparatus 200 may designate a corresponding user as the hub user if a number of signals recommending the hub user exceeds a predetermined recommendation number. Here, the reference recommendation number may be, for example, 5 to 20.

In addition, if a regular user that is not the hub user may be designated as the hub user if a certain requirement is met. For example, when a specific user is determined to have a vigorous network activity according to network management and statistical processing or a number of log-ins, a number of writing a bulletin post, a number of comments, use time, etc. exceeds a predetermined reference value, a corresponding user may be specified as the hub user.

Figure 13:
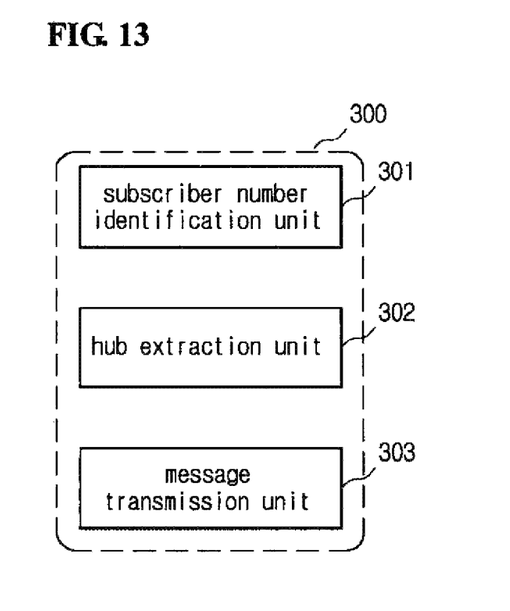
FIG. 13 is a block diagram of a network generation unit of the social network service providing apparatus according to the fifth exemplary embodiment of the present invention.

Referring to FIG. 13, the hub coupling unit 300 may include a subscriber number identification unit 301, a hub extraction unit 302, and a message transmission unit 303.

The subscription number identification unit 301 counts a number of networks subscribed by each user with respect to every user who subscribes to the social network service apparatus 200. For example, when a user A subscribes to 10 networks and a user B subscribes to 20 networks, the subscription number identification unit 301 counts a number of subscribed networks for each user.

The hub extraction unit 302 designates a user, who has a number of subscribed networks is greater than the reference number of subscribed networks, as the hub user.

The message transmission unit 303 transmits the signal requesting suggestion of the network to a terminal of the user who is designated as the hub user.

Figure 14:
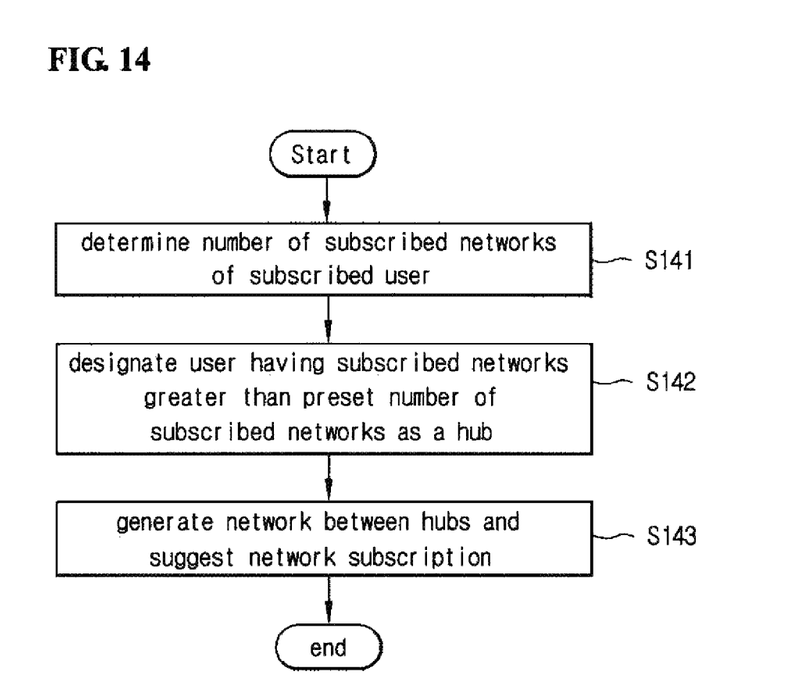
FIG. 14 is a flowchart of the social network service providing apparatus according to the fifth exemplary embodiment of the present invention.

FIG. 14 is a flowchart of the social network service providing apparatus according to the fifth exemplary embodiment of the present invention.

At step S141, the subscription number identification unit 301 counts a number of subscribed networks of a subscribed user with respect to entire subscribers subscribed to the social network service apparatus 200.

In addition, according to another exemplary embodiment, the subscription number identification unit 301 may count a number of subscribed networks of a subscribed user with respect to a subscriber who belongs to a specific category among entire subscribers subscribed to the social network service apparatus 200. Here, the specific category may be a category specified by setting, for example, a gender, an age, an area, and an interest field based on subscriber information. For example, the subscription number identification unit 301 may count the number of subscribed network with respect to a user in twenties who has an interest in politics and lives in Seoul. In this case, an advantage of extracting a hub user having a similar disposition may be obtained.

At step S142, the hub extraction unit 302 designates the user having subscribed networks greater than a preset number of subscribed networks as the hub user, and at step S413, the hub coupling unit 300 may transmit a network generation suggestion request signal and/or a network subscription request signal to each hub user to generate a network which is designated as the hub and comprises specific users as members thereof.

Figure 15:
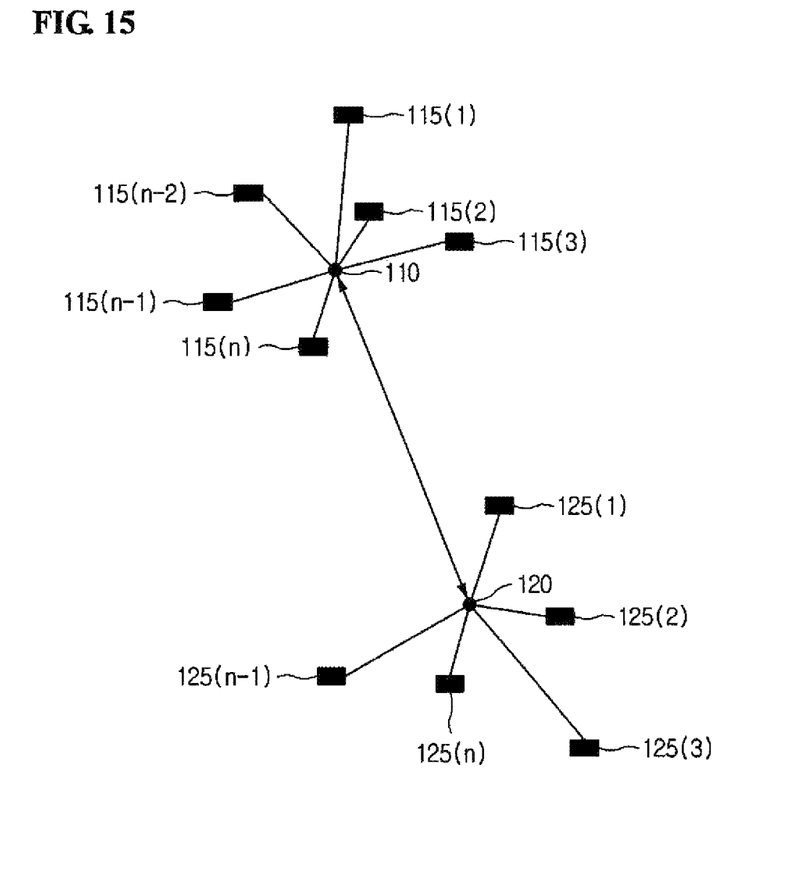
FIG. 15 is a schematic diagram of a social network service according to the fifth exemplary embodiment.

FIG. 15 is a schematic diagram of a social network service according to the fifth exemplary embodiment. If the reference number of subscribed network is n and a first user 110 is coupled to n networks (1-1 network 115, . . . , 1-n network 115(n)) and a second user 120 is coupled to n networks (2-1 network 125, . . . , 2-n network 125(n)), the first user 110 and the second user may be designated as a first hub 110 and a second hub 120, respectively. Thus, when forming a network comprising each hub as a member thereof, each hub belongs to a network where it is possible to exchange information and opinions with one another, and thus, which is an opportunity, from each hub's standpoint, to get to know another hub and a contribution to an overall network expansion, i.e., a connection point, from an entire network structure's standpoint. For example, by connecting the first hub 110 and the second hub 120, information may be exchanged between the first hub 110 and the second hub 120, and thus, information of the 1-1 network 115 may be known to the 2-1 network 125. Therefore, according to the present embodiment, an advantage of easily exchanging identification information (keyword) between different networks may be achieved.

In addition, according to another exemplary embodiment of the present invention, the keyword of the hub user may be viewed by another user. In this case, a regular user who is not the hub user may expand the subscribed network immediately as many as a number of subscribed networks of the hub user by modifying a keyword thereof with reference to the keyword of the hub user. For example, if the hub user (first user) has a predetermined number (for example, 100) of keywords, a regular user (second user) who is different from the hub user imports the hub user's keyword to be recorded as his or her keyword such that the regular user may subscribe to a corresponding network by receiving a signal requesting subscription to a network to which the hub user has already been subscribed. In this case, the regular user may directly subscribe to the network as many as the subscribed networks of the hub user, thereby being characterized to immediately expand a human relationship online.

Here, a method of importing the hub user's keyword to be recorded his or her keyword by the regular user may be implemented by various ways. For example, the regular user may type the hub user's keyword one by one to be input as his or her keyword or copy the hub user's keyword to be pasted in his or her keyword input section in a copy and paste manner.

Further, according to another method, the present exemplary embodiment may be equipped with a network import function. In other words, the network import function performs a function of copying the hub user's keyword as the regular user's keyword by receiving a keyword request signal of the regular user. For example, when the regular user clicks a button to perform the network import function provided on an information reading screen of the hub user, the hub user's keyword may be added to the regular user's keyword. In other words, the present embodiment may further include a keyword copying unit which copies the hub user's keyword to be added to the regular user's keyword.

In addition, a keyword selection unit may be provided which may select an entire or portion of the hub user's keyword to import the entire or portion of the hub user's keyword according to the regular user's selection. In this case, as described above, a plurality of networks corresponding to the keyword may be recommended to the regular user and, when the regular user subscribes to the recommended network, the regular user may be a third hub user.

As described above, it has been described a case in which the hub user's keyword is imported, however, the present invention is not limited thereto, and the present invention may also be applied to a case of importing a keyword of the regular user who is not the hub user, a case of importing a keyword between the hub users, and a case of importing a keyword between the regular users. In other words, the first user and the second user may be the hub user or the regular user, respectively. In this case, the subscribed network may become equalized, and thus, a characteristic of multiple users being capable of sharing the same experience in the same network may be achieved.

A detailed system configuration view, an embedded system, a common platform technology such as an O/S and a communication protocol, and an interface standardization technology such as I/O interface of the social network service providing apparatus according to an exemplary embodiment of the present invention are well known to a person of ordinary skill in the art, and therefore, a detailed description thereof will be omitted.

The social network service providing method according to the present invention may be implemented in the form of a program command executable by various computer means and recorded in a computer readable recording medium. In other words, the recording medium may be a recording medium readable by a computer which stores a program for executing each step described above by the computer.

The computer readable recording medium may include program commands, data files, data structures, or the like, alone or a combination thereof. The program commands of the computer readable recording medium may be designed and configured specially for the sake of the present invention, or may be of the kind well-known and readily available to those skilled in the computer software field. Examples of the computer readable recording medium include magnetic media such as hard disks, floppy disks and magnetic tapes, optical media such as CD-ROMs, DVD, magneto-optical media such as floptical disks, and hardware devices such as ROMs, RAMs, flash memories, etc., that are configured specially to store and execute program commands.

Also, each element described in the exemplary embodiments of the present invention may be implemented in one component physically adjacent or different components. In the latter case, each element may be located close to one another or in different areas to be controlled, and in this case, the present invention may control each element wire or wirelessly by providing a separate control means or control chamber for controlling each element.

The detailed description for the detailed system configuration, embedded system, common platform technology such as O/S, communication protocol, I/O interface according to the embodiment of the present invention will be omitted from here since it is the obvious content to those having ordinary skill in the field of technology where the present invention pertained.

The social network service providing device according to the present invention recommends the network subscription to the user or request a suggestion to form a new network when the user newly subscribes, and when the existing user changes the keyword, recommends the network or requests generation of the network corresponding to the changed keyword, and when the third user generates a network, recommends the user corresponding to the corresponding network to subscribe thereto, thereby achieving an advantage of broadening a human relationship of the user online by expanding a network with various methods.

In addition, the social network service providing apparatus according to the present invention implements a network of a complete equality type in which positions of members are equal to one another, and therefore, information asymmetry between the members does not exit and, even if the information asymmetry exists, recognition between users may be automatically performed by a system, thereby achieving an effect to expand a scale of a network to be generated to a maximum extend in real time.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for providing a social network service in a service server, the method comprising:
    receiving a first keyword input directly and designated explicitly for generating and joining a network by a first member in correspondence with the first member's current interest from a first terminal of the first member of members of the service server;
    generating the network having the first keyword as identification information of the network when such a network has not previously been created, wherein the network is generated directly from the first keyword input and designated explicitly for generating and joining the network by the first member and includes an online community;
    transmitting a first message to at least a second member of the service server with an invitation inviting the second member to join the network when a second keyword is inputted by the second member and the second keyword is identical or analogous to the first keyword, wherein the second member is added to the network when the second member accepts the invitation to join the network.

2. The method of claim 1, further comprising:
    receiving a third keyword input and designated explicitly for generating or joining a network by a third member in correspondence with the third member's current interest from a third terminal of the third member of the members of the service server;
    determining whether the third keyword is identical or analogous to the first keyword; and
    transmitting a second message inviting to join the network related to the first keyword to the third terminal when the third keyword is identical or analogous to the first keyword.

3. The method of claim 2, wherein each of the first, second and third keywords includes a character or a symbol.

4. The method of claim 2, further comprising:
    receiving a request for changing the third keyword to a fourth keyword input and designated explicitly for generating or joining the network by the third member in correspondence with the third member's current interest from the third terminal;
    determining whether the fourth keyword is identical or analogous to another keyword; and
    transmitting a third message inviting to join a network having the other keyword as identification information of the network to the third terminal when the fourth keyword is identical or analogous to the other keyword.

5. The method of claim 1, wherein members of the network share their interest associated with the first keyword on the network having the first keyword as identification information of the network.

6. A method for providing a social online network service in a service server, the method comprising:
    receiving a first keyword input and designated explicitly for generating and joining a network by a first member in correspondence with the first member's current interest from a first terminal of the first member of members of the service server;
    generating the network having the first keyword as identification information of the network when such a network has not previously been created, wherein the network is generated directly from the first keyword input and designated explicitly for generating and joining the network by the first member, and transmitting a first message to at least a second member of the service server with an invitation inviting at least the second member to join the network when a second keyword is inputted by at least the second member and the second keyword is identical or analogous to the first keyword, wherein at least the second member is added to the network when at least the second member accepts the invitation to join the network, wherein the transmitting the first message to at least the second member is configured to be determined only by the service server.

* * * * *

UNITED STATES PATENT AND TRADEMARK OFFICE
CERTIFICATE OF CORRECTION

PATENT NO. : 11,188,989 B2
APPLICATION NO. : 15/002594
DATED : November 30, 2021
INVENTOR(S) : Sung Kwan Hong Page 1 of 1

It is certified that error appears in the above-identified patent and that said Letters Patent is hereby corrected as shown below:

On the Title Page

Item (22) Filed: Jan. 21, 2016 needs to be replaced with the following:
(22) PCT Filed: Aug. 31, 2011

And the following new items need to be added:
(86) PCT No.: PCT/KR2011/006431
§371(c)(1),(2) Date: Apr. 23, 2013
(87) PCT Pub. No.: WO 2012/057448
PCT Pub. Date: May 3, 2012
(30) Foreign Application Priority Data
Oct. 25, 2010 (KR) ............. 10-2010-0104014

Signed and Sealed this
Twentieth Day of February, 2024

Katherine Kelly Vidal
*Director of the United States Patent and Trademark Office*